United States Patent
Lin et al.

(10) Patent No.: US 7,569,645 B2
(45) Date of Patent: Aug. 4, 2009

(54) CURABLE SILYL-CONTAINING POLYMER COMPOSITION CONTAINING PAINT ADHESION ADDITIVE

(75) Inventors: Zhiqing Lin, Loudonville, NY (US); David A. Williams, Gansevoort, NY (US); Shayne J. Landon, Ballston Lake, NY (US); Scott Pregont, Mechanicville, NY (US); Eric Pohl, Mount Kisco, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 0 days.

(21) Appl. No.: 11/823,306

(22) Filed: Jun. 27, 2007

(65) Prior Publication Data

US 2009/0005498 A1    Jan. 1, 2009

(51) Int. Cl.
C08F 283/21   (2006.01)
C08G 77/46    (2006.01)
C08G 77/54    (2006.01)
C08L 83/12    (2006.01)

(52) U.S. Cl. .................. 525/477; 525/453
(58) Field of Classification Search .................. 525/477
See application file for complete search history.

(56) References Cited

U.S. PATENT DOCUMENTS

| | | | |
|---|---|---|---|
| 3,280,160 A | 10/1966 | Bailey | |
| 3,299,112 A | 1/1967 | Bailey | |
| 3,507,815 A | 4/1970 | Bailey et al. | |
| 3,980,688 A | 9/1976 | Litteral et al. | |
| 4,025,456 A * | 5/1977 | Litteral et al. | 516/13 |
| 4,042,528 A * | 8/1977 | Abe | 516/124 |
| 4,059,606 A * | 11/1977 | Walsingham et al. | 556/444 |
| 4,657,959 A * | 4/1987 | Bryan et al. | 524/266 |
| 4,711,714 A * | 12/1987 | Callaghan et al. | 208/348 |
| 4,797,452 A * | 1/1989 | Wideman et al. | 525/338 |
| 4,847,398 A | 7/1989 | Mehta et al. | |
| 4,857,251 A * | 8/1989 | Nohr et al. | 264/103 |
| 5,191,103 A | 3/1993 | Mehta et al. | |
| 5,354,808 A * | 10/1994 | Onwumere et al. | 524/837 |
| 5,519,104 A | 5/1996 | Lucas | |
| 5,804,099 A * | 9/1998 | Heilen et al. | 516/124 |
| 5,990,257 A | 11/1999 | Johnston et al. | |
| 6,197,912 B1 | 3/2001 | Huang et al. | |
| 7,172,809 B2 * | 2/2007 | Barancyk et al. | 428/323 |
| 2005/0137324 A1* | 6/2005 | Roesler et al. | 524/589 |
| 2006/0251902 A1* | 11/2006 | Botrie et al. | 428/423.1 |

FOREIGN PATENT DOCUMENTS

| | | | |
|---|---|---|---|
| DE | 102004055450 A1 * | 5/2006 | |
| EP | 1193278 A | 4/2002 | |
| EP | 1721948 A | 11/2006 | |
| WO | WO 97/44402 A | 11/1997 | |
| WO | WO 99/40140 A | 8/1999 | |
| WO | WO 02/081568 A | 10/2002 | |
| WO | WO 03/000775 A | 1/2003 | |
| WO | WO 2005/105938 A | 11/2005 | |
| WO | WO 2005/105939 A | 11/2005 | |
| WO | WO 2008/027499 A | 3/2008 | |

* cited by examiner

Primary Examiner—Randy Gulakowski
Assistant Examiner—Michael Dollinger
(74) Attorney, Agent, or Firm—Dominick G. Vicari

(57) ABSTRACT

A curable composition comprising a hydrolysable silyl-containing polymer and a silicone-containing paint adhesion additive that provide curable silyl-containing polymer composition which has improved adhesion of coatings, paints, adhesives, and other surface treatments thereto.

18 Claims, 1 Drawing Sheet

CURABLE SILYL-CONTAINING POLYMER COMPOSITION CONTAINING PAINT ADHESION ADDITIVE

FIELD OF INVENTION

The present invention is directed to curable silyl-containing polymer compositions. In particular, the present invention is directed to curable composition comprising a hydrolysable silyl-containing polymer and a silicone-containing adhesion additive that provide curable silyl-containing polymer composition which has improved adhesion of coatings, paints, adhesives, and other surface treatments thereto.

BACKGROUND

Coating, paints, adhesives and other surface treatments, especially waterborne versions, adhere poorly to polymer-based surfaces because these polymeric surfaces have often low surface energies, are chemically inert, or contain contaminants and other additives that form weak boundary layers. For example, hydrolysable silyl-containing polymer compositions that cure to produce elastomers at room temperature are widely used as coatings, industrial goods, sealants and caulking materials because they have a unique property profile for many applications, such as sealants used in building construction. These properties include excellent weatherability, toughness, strength, durability, ease of application, and rapid cure in place. However, the applications in which such sealants and caulking materials are used are often coated with decorative and protective coatings, such as with paints, varnishes, lacquers, and shellacs. The cured silyl-containing polymer compositions have a disadvantage in that they do not have surfaces, which accept such organic based decorative and protective coatings easily.

There is a need within the industry to have the exposed surface of the cured silyl-containing polymer compositions accept painting, for aesthetic purposes, and to provide some protection of the surface from the environment. While some cured silyl-containing polymer compositions accept some paints, it is very inconvenient to commercially provide certain cured silyl-containing polymer compositions for painting with certain kinds of paint. For example, a wide variety of coatings, paints and other surface treatments are commercially available and these compositions display varying degrees of adhesion to sealant compositions based upon the hydrolysable silyl-containing polymers. In particular, a wide variety of latex paints are commercially available and these paints display varying degrees of adhesion to sealant compositions utilizing hydrolysable silyl-containing polymers.

The present inventors have found that the surface of the cured silyl-containing polymer compositions prepared from silyl-containing polymers and silicone-containing adhesion additives will have adhesive properties to which paints, coatings and other surface treatments can easily adhere thereto, especially after curing.

SUMMARY OF THE INVENTION

The present invention provides a curable compositions comprising:
a) at least one hydrolysable silyl-containing polymer;
b) at least one silicone-containing paint adhesion additive; and, optionally,
c) at least one ingredient selected from the group consisting of filler, plasticizer, thixotrope, antioxidant, ultraviolet stabilizer, adhesion promoter, cure catalyst, moisture scavenger, pigment, dye, surfactant, solvent and biocide.

The present invention provides curable compositions utilizing silyl-containing polymers and silicone-containing adhesion additives that provide improved adhesion of paints, especially latex paints, coatings and other surface treatments thereto. Further, the present invention provides an article utilizing cured composition of silyl-containing polymers and silicone-containing paint adhesion additives to which a coating, paint and other surface treatment adhere strongly thereto.

DISCLOSURE OF THE INVENTION

Figure 1:
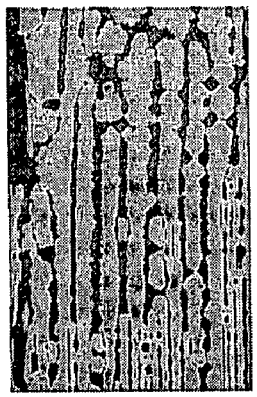
FIG. 1 depicts the scale of "poor" paintability, i.e., paint sample forms numerous non-continuous wide streaks when applied to cured sealant.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The hydrolysable silyl-containing polymers (a) include silylated polyols, silylated polyethers, silylated polyurethane resins and silane-containing copolymers derived from the copolymerization of one or more ethylenically unsaturated silanes such as vinylsilanes, allylsilanes and methallylsilanes, acryloxyalkylsilane, methacryloxyalkylsilanes and one or more other ethylenically unsaturated monomers such as olefinic hydrocarbons, acrylic acid, methacrylic acid, acrylate ester, methacrylate ester, ethylenically unsaturated dicarboxylic acids and/or their anhydrides, oligomers and/or polymers possessing ethylenic unsaturation, and the like.

In one embodiment, hydrolysable silyl-containing polymer (a) that is useful in the composition of the invention is represented by general Formula (1):

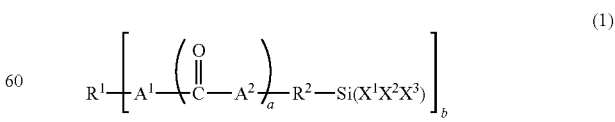

(1)

wherein:
$R^1$ is a monovalent or polyvalent organic polymer fragment having a number average molecular weight of from 500 to 100,000 grams/mole;

each occurrence of $R^2$ is independently a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;

each occurrence of $A^1$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl or —$R^2SiX^1X^2X^3$ group, wherein each $R^3$, other than hydrogen, contains from 1 to 18 carbon atoms, and with the provisos that when $A^1$ is oxygen or sulfur, then $A^2$ is $(-)_2NR^3$ and when a is 0, then $A^1$ is oxygen;

each occurrence of $A^2$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl or —$R^2SiX^7X^8X^9$ group, wherein each $R^3$, other than hydrogen, contains from 1 to 18 carbon atoms, and with the provisos that when $A^2$ is oxygen or sulfur, then $A^1$ is $(-)_2NR^3$;

each occurrence of $X^1$ is independently selected from the group consisting of $R^4O$—, $R^4C(\!=\!O)O$—, $R^4{}_2C\!=\!NO$—, $R^4{}_2C\!=\!CR^4O$—, and $R^4{}_2NO$— wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms, and, optionally, contains at least one oxygen or sulfur atom;

each occurrence of $X^2$ and $X^3$ is independently selected from the group consisting of $R^4O$—, $R^4C(\!=\!O)O$—, $R^4{}_2C\!=\!NO$—, $R^4{}_2C\!=\!CR^4O$—, $R^4{}_2NO$— and $R^4$ wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom; and, each occurrence of subscripts a and b is independently an integer wherein a is 0 or 1 and b is 1 to 6.

Useful hydrolysable silyl-containing polymer (a) include those prepared by the reaction of a polyol, preferably a polymeric diol or triol, and an isocyanatosilane. The polyol can be, e.g., a polyether polyol, polyester polyol, polyetherester polyol, polyesterether polyol or hydroxyl-terminated polybutadiene, in particular, a hydrogenated polybutadiene diol, or mixtures thereof. Other useful polyols can be polyether diols possessing low terminal unsaturation, e.g., on the order of from about 0.018 to about 0.20 meq/g, and number average molecular weights of from about 5,000 to about 100,000, obtained by oxyalkylating a difunctional initiator with ethylene oxide, propylene oxide or mixtures thereof employing a double metal cyanide (DMC) catalyst.

Useful isocyanatosilanes for silylating these and other polyols are provided by Formula (2):

$$O\!=\!C\!=\!N\!-\!R^5SiX^1X^2X^3 \quad (2)$$

wherein:

$R^5$ is a divalent hydrocarbyl group congaing from 1 to 12 carbon atoms selected from the group consisting of divalent alkylene, alkenylene, arenylene, arylene and aralkylene, and, optionally, contains at least one heteroatoms selected from the group consisting of oxygen and sulfur;

each occurrence of $X^1$ is independently selected from the group consisting of $R^4O$—, $R^4C(\!=\!O)O$—, $R^4{}_2C\!=\!NO$—, $R^4{}_2C\!=\!CR^4O$—, and $R^4{}_2NO$— wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms, and, optionally, contains at least one oxygen or sulfur atom;

each occurrence of $X^2$ and $X^3$ is independently selected from the group consisting of $R^4O$—, $R^4C(\!=\!O)O$—, $R^4{}_2C\!=\!NO$—, $R^4{}_2C\!=\!CR^4O$—, $R^4{}_2NO$— and $R^4$ wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom.

Representative non-limiting examples of isocyanatosilanes include isocyanatopropyltrimethoxysilane, isocyanatoisopropyltrimethoxsilane, isocyanato-n-butyltrimethoxsilane, isocyanato-t-butyltrimethoxysilane, isocyanatopropyltriethoxysilane, isocyanatoisopropyltriethoxysilane, isocyanato-n-butyltriethoxysilane, isocyanato-t-butyltriethoxysilane, isocyanatomethyltrimethoxysilane; isocyanatomethyltriethoxysilane, isocyanatomethylmethyldimethoxysilane, isocyanatomethylmethyldiethoxysilane, and the like, as well as mixtures thereof.

The synthesis is monitored using a standard titration technique (ASTM 2572-87) or infrared analysis. Silylation of the polyol is considered complete when no residual isocyanate group (—NCO) can be detected by either technique.

The hydrolysable silyl-containing polymers (a) can be obtained from the direct reaction of the diol with an isocyanatosilane without initial formation of an intermediate polyurethane prepolymer. Clearly, one of the benefits of this synthetic approach is the formation of polymer (a) using a one-step process. Details of this chemistry are discussed in U.S. Pat. No. 5,990,257, the entire contents of which are incorporated herein by reference.

The hydrolysable silyl-containing polymers (a) as prepared above may contain a small quantity (typically less than 0.10%) of residual un-reacted isocyanate as determined by either titration or infrared spectroscopy. In this instance an isocyanate scavenging agent can be added to the resin. Typical scavengers include, primary or secondary aminosilanes, such as gamma-aminopropyltrimethoxysilane, N-beta-aminoethyl-gamma-aminopropyltrimethoxysilane or N-ethyl-gamma-aminoisobutyltrimethoxysilane, low molecular weight alcohols, such as methanol, ethanol or isopropanol, primary or secondary amines, such as butyl amine or dibutylamine, mercaptosilanes, such as mercaptopropyltriethoxysilane, or ammonium salts, such as ammonium carbonate or ammonium lactate. These reagents are simply post added to the hydrolysable silyl-containing polymer (a) to remove the excess isocyanate groups.

The useful hydrolysable silyl-containing polymers (a) of the invention include those obtained from the end-capping of isocyanate-terminated polyurethane prepolymers with an active hydrogen-containing hydrolysable silane.

These hydrolysable silyl-containing polymers (a) can be produced by reacting an isocyanate-terminated polyurethane prepolymer, itself obtained from the reaction of a stoichiometric excess of organic polyisocyanate with a polyol such as any of those aforementioned, and preferably from the reaction of a diisocyanate such as isophorone diisocyanate (IPDI) with a polyether diol such as any of those aforementioned, with a silane possessing functionality that is reactive for the isocyanate group, in particular, secondary amine or mercapto functionality. The polyurethane prepolymers bearing terminal active isocyanate groups are useful for production of hydrolysable silyl-containing polymers (a) and can be prepared by the reaction of an organic di- or polyisocyanate reactant in stoichiometric excess of polyol reactants (as described herein above) and further reacted with an aminosilane.

Isocyanate-terminated polyurethane prepolymers are obtained by reacting one or more polyols, advantageously, diols, with one or more polyisocyanates (as described herein above), advantageously, diisocyanates, in such proportions that the resulting prepolymers will be terminated with isocyanate. In the case of reacting a diol with a diisocyanate, a molar excess of diisocyanate will be employed.

Silylation reactants for reaction with the isocyanate-terminated polyurethane prepolymers described above must contain functionality that is reactive with isocyanate and at least one readily hydrolyzable and subsequently crosslinkable group, e.g., alkoxy. Particularly useful silylation reactants are the silanes of the general Formula (4): The isocyanate-terminated prepolymer after the reaction of the polyol with the polyisocyanate has the general Formula (3)

$$R^6-[-(N=C=O)]_c \quad (3)$$

wherein $R^6$ and subscript c is an integer wherein c is 2 to 6. It is understood that $R^6$ polymer fragment may contain a urethane group as a result of the reaction of the polyol with an isocyanate group. The isocyanate-terminated prepolymer is prepared by reacting diisocyanates with polyols at different ratios of NCO to OH that range specifically from about 1.1 to about 2.0, more specifically from about 1.4 to about 1.9 and most specifically from about 1.6 to about 1.8.

Suitable polyisocyanates include any from which polyurethane polymers can be prepared by the customary sequence of reaction with polyol to form a prepolymer. Useful diisocyanates include, for example, 2,4-toluene diisocyanate, 2,6-toluene diisocyanate, a mixture of 2,4- and 2,6-toluene diisocyanate isomers [most of the TDI from markets are the mixture], 4,4'-diphenyl-methanediisocyanate, isophorone diisocyanate, dicyclohexylmethane-4,4'-diisocyanate, various liquid diphenylmethane-diisocyanates containing a mixture of 2,4- and 4,4' isomers, and the like, and mixtures thereof. In one embodiment of the present invention, the isocyanate functional monomer employed is an isophorone diisocyanate (IPDI) available from Bayer under the trade name Desmodur I D 230.

A catalyst may be used in the preparation of the above-mentioned isocyanate-terminated prepolymers. Suitable catalysts are metal salts or bases, and include the non-limiting examples of bismuth salts, such as bismuth trisneodecanoate and other bismuth carboxylates; zirconium compounds or aluminum compounds, such as zirconium chelates and aluminum chelates; dialkyltin dicarboxylates, such as dibutyltin dilaurate and dibutyltin acetate, tertiary amines, the stannous salts of carboxylic acids, such as stannous octoate and stannous acetate, and the like.

In a second process step, the isocyanate-terminated prepolymer of general Formula (3) is reacted with silane(s) that contain an active hydrogen functional group to prepare hydrolysable silyl-containing polymer (a). The silanes that contain an active hydrogen functional group are provided by the general Formula (4):

$$H-Y^1-R^2SiX^1X^2X^3 \quad (4)$$

wherein $R^2$, $X^1$, $X^2$ and $X^3$ have the aforestated meanings, and each occurrence of $Y^1$ is independently selected from the group consisting of oxygen (—O—), sulfur (—S—), $(-)_2NR^3$, $-NR^3(C=O)NR^3-$, $-NR^3(C=O)O-$ and $-NR^3(C=O)S-$, wherein $R^3$ is hydrogen, alkyl, alkenyl, arenyl, aralkyl or $-R^2SiX^1X^2X^3$ group, wherein each $R^3$, other than hydrogen, contains from 1 to 18 carbon atoms.

The silane terminating reactions of the present invention can be any kind as known in the art, e.g., those reactions disclosed in U.S. Pat. No. 6,197,912 and U.S. Pat. No. 5,990,257, the entire contents of which are incorporated herein by reference.

In one embodiment of the present invention, the active hydrogen organofunctional silanes include, e.g., primary and secondary amino-alkoxysilanes, ureidoalkoxysilane, carbamatosilane, thiocarbamatosilane and mercaptoalkoxysilanes.

Specific silanes for use herein include the ureidosilanes, such as the non-limiting examples of 3-ureidopropyltrimethoxysilane, 3-ureidopropyltriethoxysilane, 3-ureidopropylmethyldiethoxysilane, 3-ureidopropylmethyldimethoxysilane, ureidomethyltrimethoxysilane, ureidomethylmethyldimethoxysilane and mixtures thereof.

Specific silanes for use herein include the carbamatosilanes and thiocarbamatosilanes, such as the non-limiting examples of N-(3-trimethoxysilylpropyl) methyl carbamate, N-(3-trimethoxysilylmethyl) methyl carbamate, N-(3-triethoxysilylpropyl) methyl carbamate, N-(3-triethoxysilylmethyl) methyl carbamate, N-(3-trimethoxysilylpropyl) methyl thiocarbamate, N-(3-trimethoxysilylmethyl) methyl thiocarbamate, N-(3-triethoxysilylpropyl) methyl thiocarbamate, N-(3-triethoxysilylmethyl) methyl thiocarbamate, N-(3-trimethoxysilylpropyl) methyl carbamate, N-(3-trimethoxysilylmethyl) ethyl carbamate, N-(3-triethoxysilylpropyl) ethyl carbamate, N-(3-triethoxysilylmethyl) ethyl carbamate, O-(3-trimethoyxsilylpropyl) carbamate and mixtures thereof.

Specific silanes for use herein include the mercaptosilanes, such as the non-limiting examples of 2-mercaptoethyltrimethoxysilane, 3-mercaptopropyltrimethoxysilane, 2-mercaptopropyltriethoxysilane, 3-mercaptopropyltriethoxysilane, 2-mercaptoethyltripropoxysilane, 2-mercaptoethyltri-sec-butoxysilane, 3-mercaptopropyl-tri-t-butoxysilane, 3-mercaptopropyltriisopropoxysilane, 3-mercaptopropyltrioctoxysilane, 2-mercaptoethyltri-2'-ethylhexoxysilane, 2-mercaptoethyldimethoxyethoxysilane, 3-mercaptopropylmethoxyethoxypropoxysilane, 3-mercaptopropyldimethoxymethylsilane, 3-mercaptopropylmethoxydimethylsilane, 3-mercaptopropylethoxydimethylsilane, 3-mercaptopropyldiethoxymethylsilane, 3-mercaptopropylcyclohexoxydimethylsilane, 4-mercaptobutyltrimethoxysilane, 3-mercapto-3-methylpropyltrimethoxysilane, 3-mercapto-3-methylpropyltripropoxysilane, 3-mercapto-3-ethylpropyldimethoxy methylsilane, 3-mercapto-2-methylpropyltrimethoxysilane, 3-mercapto-2-methylpropyldimethoxyphenylsilane, 3-mercaptocyclohexyltrimethoxysilane, 12-mercaptododecyltrimethoxy silane, 12-mercaptododecyltriethoxysilane, 18-mercaptooctadecyltrimethoxysilane, 18-mercaptooctadecylmethoxydimethylsilane, 2-mercapto-2-methylethyltripropoxysilane, 2-mercapto-2-methylethyltrioctoxysilane, 2-mercaptophenyltrimethoxysilane, 2-mercaptophenyltriethoxysilane, 2-mercaptotolyltrimethoxysilane, 2-mercaptotolyltriethoxysilane, 1-mercaptomethyltolyltrimethoxysilane, 1-mercaptomethyltolyltriethoxysilane, 2-mercaptoethylphenyltrimethoxysilane, 2-mercaptoethyiphenyltriethoxysilane, 2-mercaptoethyltolyltrimethoxysilane, 2-mercaptoethyltolyltriethoxysilane, 3-mercaptopropylphenyltrimethoxysilane and, 3-mercaptopropylphenyltriethoxysilane, and mixtures thereof.

Useful silanes include primary and secondary aminosilanes such as the non-limiting examples of aminomethyltrimethoxysilane, 3-aminopropyltrimethoxysilane, 3-aminopropylmethyldimethoxysilane, aminomethylmethyldimethoxysilane, 3-aminopropyldimethyl(methylethyloximato)silane, 3-aminopropyltriethoxysilane, N-methylaminopropyltrimethoxysilane, N-ethylaminoproyltrimethoxysilane, N-methylaminoisobutyltrimethoxysilane, N-methylaminopropyltrimethoxysilane, N-methylaminobutyltriethoxysilane, N-methylaminopropylmethoxydiethoxysilane, N-methylaminopropyldimethylmethoxysilane, N-methylaminobutylethyldiethoxsilane; N-methylaminobutyldiethylethoxysilane, N,N-bis(3-trimethoxysilylpropyl) amine, N,N-bis-(3-triethoxysilylpropyl) amine, N,N-bis-(3-triethoxysilylbutyl) amine, dibutyl maleate adduct of 4-amino-3,3-dimethylbutyltrimethoxysilane and the like. Mixtures of these and similar silanes can, of course, also be employed as silylating reactants Preferred active-hydrogen-containing silanes are N-phenyl-3-aminopropyltrimethoxysilane, N-methyl-3-aminopropyltrimethoxysilane, N-butyl-3-aminopropyltrimethoxy silane, 4-amino-3,3-dimethylbutyltrimethoxysilane, N-cyclohexyl-3-aminopropyltrimethoxy silane, dibutyl maleate adduct of 3-aminopropyltrimethoxy silane, dibutyl maleate adduct of 4-amino-3,3-dimethylbutyltrimethoxysilane, 3-aminopropyltriethoxysilane, bis-(3-trimethoxysilylpropyl) amine, 3-aminopropylmethyldimethoxysilane, 3-aminopropyldimethyl(methylethyloximato)silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)propyltrimethoxysilane, N-ethyl-4-amino-3,3 dimethylbutyldimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, 3-mercaptopropyltrimethoxysilane, 3-mercaptopropyltriethoxysilane, 3-mercaptopropylmethyldimethoxysilane, 3-ureidopropyltrimethoxysilane, 3-ureidopropylmethyldimethoxysilane, O-(3-trimethoyxsilylpropyl) carbamate and mixtures thereof.

Yet another type of hydrolysable silyl-containing polymer (a) useful in the present invention can be produced by reacting a hydroxyl-terminated polyurethane prepolymer, itself obtained from the reaction of a stoichiometric excess of polyol with a polyisocyanate, and advantageously from the reaction of a polyether diol such as any of those aforementioned with a diisocyanate such as isophorone diisocyanate, and then with an isocyanatosilane such as any of those mentioned above. The additional hard segments formed by the chain extender not only improves the prepolymers' elasticity but also the adhesion to many organic substrates.

The polyurethane prepolymers bearing terminal active hydrogen atoms are useful for production of hydrolysable silyl-containing polymer (a) and can be prepared by the reaction of an organic di- or polyisocyanate reactant with a stoichiometric excess of a polyol reactant that can be a polyether polyol or comprises a combination of polyols. Depending on the reactivity of the respective reactants, a catalyst might be employed. The reaction temperature is typically in the range of 60° to 90° C.; the reaction time is typically on the order of about 2 to 8 hours.

Suitable organic di- and polyisocyanates include, but are not limited to, diisocyanates such as 2,4-toluene diisocyanate (TDI), 2,6-toluene diisocyanate, 4,4'-diphenyl-methanediisocyanate (MDI), 2,4'-diphenyl-methanediisocyanate, isophorone diisocyanate (IPDI), 4,4'-dicyclohexylmethane-diisocyanateisomers, Desmodur N and the like, and mixtures thereof.

For the production of the polyurethane prepolymers one or more diols and triols can be employed in the reaction such as polyether polyols, polyester polyols, polybutadienediols, polyoxyalkylene diols, polyoxyalkylene triols, polytetramethylene glycols, polycaprolactone diols and triols, and the like, having two or more hydroxyl groups. Or a blend of monols with diols or triols. Preferred polyols are polypropylene glycols. The polyols employed here have a low unsaturation level and therefore high functionality. These polyols are typically prepared using metal complex catalysts for the polymerization of alkylene oxide resulting in polyols having a low level of terminal ethylenic unsaturation that is generally less than 0.2, preferably less than 0.1, and more preferably less than 0.02, milliequivalents per gram (meq/g) of polyol. The number average molecular weight of the polyols is typically in the range between 500 and 50,000, preferably between about 2,000 and 20,000.

To prepare active hydroxyl group-terminated polyurethanes useful in this invention, at least a slight molar excess of the hydroxyl equivalents (—OH groups) with respect to the —NCO equivalents (groups) is employed to terminate the polymer chains with hydroxyl groups. The preferred molar ratio of the NCO to OH is from about 0.3 to 0.95, and more preferably between 0.4 and 0.8, depending on the polyol in use.

The initially formed polyurethane prepolymers from above are subsequently "endcapped" with an isocyantosilane in a second step to form the desired hydrolysable silyl-containing polymer (a). Isocyanatosilane suitable for the endcapping of the active hydrogen terminal atoms bearing urethane prepolymers are represented by the general Formula (3) described herein above.

In one embodiment of the invention, the isocyanatosilane suitable for the endcapping of the active hydrogen terminal atoms bearing urethane prepolymers include gamma-isocyanatopropyltriethoxy silane (A-Link 25 or Silquest A-1310, from Momentive Performance Materials) and gamma-isocyanatopropyltrimethoxysilane (A-Link 35, from Momentive Performance Materials).

The polyurethane prepolymer having active hydrogen atoms is reacted in an approximately stoichiometric amount with the above described isocyanatosilane to form a stable polymer (a) having one or more terminal alkoxysilane groups.

The polyurethane prepolymer synthesis as well as the subsequent silylation reaction is conducted under anhydrous conditions and preferably under an inert atmosphere, such as a blanket of nitrogen, to prevent premature hydrolysis of the alkoxysilane groups. A typical temperature range for both reaction steps, is 0° to 150° C., and more preferably between 60° and 90° C. Typically, the total reaction time for the synthesis of the silylated polyurethane is between 4 to 8 hours.

Catalysts typically used in the preparation of the above mentioned polyurethane prepolymers as well as of the related silylated polyurethanes are dialkyltin dicarboxylates, such as dibutyltin dilaurate and dibutyltin acetate, tertiary amines, the stannous salts of carboxylic acids, such as stannous octoate and stannous acetate, and the like. According to one specific embodiment of the invention, the catalyst is dibutyltin dilaurate.

For further details regarding the hydrolysable silyl-containing polymer of Formula (1), reference may be made to pending commonly assigned Huang et al. U.S. patent application Ser. No. 11/715,000, filed Mar. 7, 2007, entitled "Moisture-Curable Silylated Polymer Resin Composition," the entire contents of which are incorporated by reference herein.

Low VOC hydrolysable silyl-containing polymers (a) are disclosed in U.S. patent application, Ser. No. 11/290,045, filed on Dec. 1, 2005, the entire contents of which are incorporated by entirety herein.

According to one embodiment of the present invention, the hydrolysable silyl-containing polymer (a) is present in an amount that ranges from 90 to 99.95 weight percent, and in another embodiment from 95 to 99.9 weight percent and in yet another embodiment from 97 to 99.5 weight percent based upon the total weight of hydrolysable silyl-containing polymer (a) and silicone-containing paint adhesion additive (b).

The silicone-containing paint adhesion additive (b) is silicone polymer containing pendent polyalkylene oxide groups. In one embodiment, the silicone-containing paint adhesion additive is described by the general Formula (5):

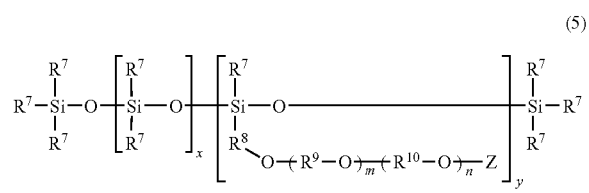

(5)

wherein:
each occurrence of $R^7$ is independently a monovalent hydrocarbon group having from 1 to 6 carbon atoms;
each occurrence of $R^8$ is independently a divalent hydrocarbon having from 1 to 10 carbon atoms;
each occurrence of $R^9$ is a divalent, straight chain alkylene group having from 2 to 6 carbon atoms;
each occurrence of $R^{10}$ is a divalent, branched alkylene group having from 3 to 6 carbon atoms;
each occurrence of Z is selected from the group consisting of hydrogen, a hydrocarbyl radical having from 1 to 12 carbon atoms, and a —C(=O)$R^{11}$ group, wherein $R^{11}$ is a hydrogen or a hydrocarbyl radical having from 1 to 20 carbon atoms;
each occurrence of the subscripts m, n, x and y are integers wherein m is 1 to 100; n is 1 to 100; x is 10 to 200; and y is 1 to 20.

The silicone-containing paint adhesion additive (b) requires several features to provide the improved adhesion properties to the curable compositions. The silicone-containing paint adhesion additive (b) needs to have sufficient number of silicone repeat units to control the solubility of the additive (b) in the curable compositions and to provide sufficient entanglement with the cured silyl-containing polymers to prevent debonding when stress is applied to the coated layer of paint, coatings or other surface treatments. The paint additive (b) needs to have a sufficient number of polyalkylene oxide units of sufficient molecular weight to increase the wetting of the coating, paint or other surface treatment and to interact with the polymers and/or emulsion particles of these materials. The polyalkylene oxide groups consist of linear and/or branched alkylene oxide repeat units. These linear and branched alkylene oxide units can be randomly distributed or can occur in blocks of linear and blocks of branched alkylene oxide repeat units. Blocks of linear alkylene oxide units, preferably ethylene oxide, are covalently bonded to the silicone backbone through the $R^8$ group and blocks of branched alkylene oxide units, preferable propylene oxide units, are covalently bonded to the linear polyalkylene oxide fragment. However, if the polyalkylene oxide groups are composed of all linear alkylene oxide units, such as ethylene oxide, then it is desirable for the capping group, Z, to be hydrophobic, so that it can better interact with the paint or latex particle. The Z group is hydrophobic when $R^{11}$ is and alkyl, alkenyl, aryl, aralkyl or arenyl group having from 6 to 20 carbon atoms.

In another embodiment herein, each $R^7$ is methyl; $R^5$ is propylene; $R^9$ is ethylene; $R^{10}$ is 2-methylethylene (isopropylene); m is 50 to 50; n is 5 to 50; x is 50 to 150; and y is 3 to 20.

Representative, non-limiting examples of the silicone-containing paint adhesion additive include:

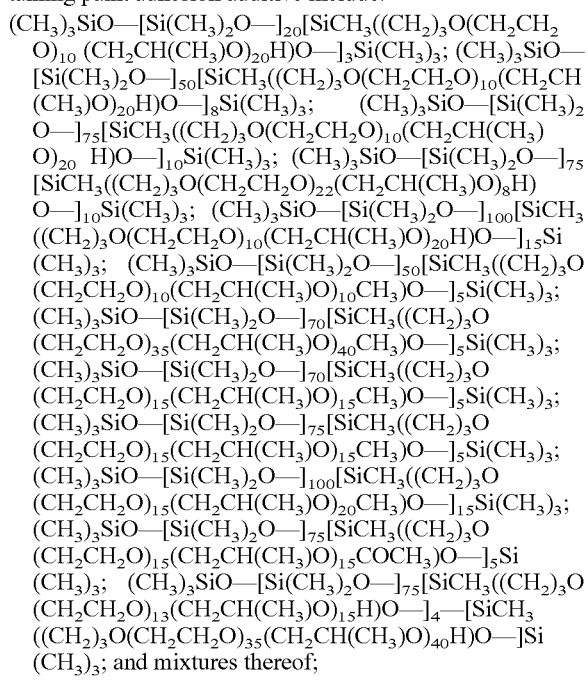

The silicone-containing paint adhesion additive (b) are clear, colorless or slightly colored liquid or wax with viscosities ranging from 100 to 5000 cSt. In one embodiment, the 0.1% surface tension is from about 28 to 40 mN/m, preferably from 30 to 38 mN/m, and more preferably from 33 to 36 mN/m. The critical micelle concentration (CMC) ranges from 0.01 to 0.1 gram, preferable from 0.015 to 0.05 gram and most preferably from 0.02 to 0.04 gram silicone-containing paint adhesion additive per 100 grams solution.

The silicone-containing paint adhesion additives (b) of the present invention are silicone-polyether copolymers that can be prepared by general methods that are well known to those skilled in the art. For example, U.S. Pat. Nos. 3,280,160; 3,299,112; and 3,507,815 report the synthesis of copolymers of this type and demonstrate their utility as polyurethane foam stabilizers, as additives for personal care items, and as processing aids for textile applications. The copolymers can be prepared from all polyethers and polydimethylmethylhydride siloxanes in the presence (U.S. Pat. Nos. 3,980,688 and 4,025,456) or absence (U.S. Pat. Nos. 4,847,398 and 5,191, 103) of a solvent. The disclosures of the above mentioned patents are incorporated herein by reference in their entirety.

According to one embodiment of the present invention, the silicone-containing paint adhesion additive is present in an amount that ranges from 0.05 to 10 weight percent, and in another embodiment from 0.1 to 5 weight percent and yet another embodiment form 0.5 to 3 weight percent based upon the total weight of hydrolysable silyl-containing polymer (a) and silicone-containing paint adhesion additive (b).

Furthermore, curable compositions comprising at least one hydrolysable silyl-containing polymer and at least one silicone-containing paint adhesion additive can optionally, contain at least one ingredient selected from the group consisting of filler, plasticizer, thixotrope, antioxidant, ultraviolet stabilizer, adhesion promoter, biocide, cure catalyst, moisture scavenger, pigment, dye, surfactant, solvent and biocide.

A variety of phenols and hindered amines are suitable for stabilizing polymer (a). Representative non-limiting examples include phenols, such as Irganox 1010, tetrakis [methylene(3,5-di-tert-butyl-4-hydroxyhydrocinnamate)] methane; Irganox 1076, octadecyl 3,5-di-tert-butyl-4-hydroxyhyrocinnamate; Irganox 1135, 3,5-di-tert-butyl-4-hydroxyhydrocinnamic acid, C7-9 branched alkyl esters; Ethanox 330, 1,3,5-trimethyl-2,4,6-tris(3,5-di-tert-butyl-4-hydroxybenzyl)benzene; Ethanox 703, 2,6-di-t-butyl-4-(N, N'-dimethylaminomethyl)phenol; Ionol, 2,6-di-t-butyl-4-methylphenol; TEMPO, 2,2,6,6-tetramethyl-1-piperidinyloxy free radical; 4-hydroxyTEMPO, 4-hydroxy-2,2,6,6-tetramethyl-1-piperidinyloxy free radical. Examples of hindered amines include Irganox 5057, a substituted aromatic amine; Tinuvin 327, 2-(3,5-di-tert-butyl-2-hydroxyphenyl)-5-chlorobenzotriazole; Tinuvin 326, 2-(5-chloro-2H-benzotriazole-2-yl)-6-(1,1-dimethylethyl)-4-methylphenol; Tinuvin 622, dimethyl succinate polymer with 4-hydroxy-2,2,6,6-tetramethyl-1-piperidineethanol; Tinuvin 213, poly(oxy-1,2-ethanediyl), ($\alpha$,(3-(3-(2H-benzotriazol-2-yl)-5-(1,1-dimethylethyl)-4-hydroxyphenyl)-1-oxopropyl)-$\omega$-hydroxy. The Irganox and Tinuvin's are available from Ciba Geigy.

The phenols and hindered amines can be used either alone or in combination. These additives are used at a level of 0.1 to 2.0 weight percent based upon the total weight of hydrolysable silyl-containing polymer (a) and silicone-containing adhesion additive (b). However, 0.1 to 1.0 weight percent based upon the total weight of hydrolysable silyl-containing polymer (a) and silicone-containing adhesion additive (b) is more typical.

Finally, vitamin E may also be used as an antioxidant for stabilization of the hydrolysable silyl-containing polymer (a) and silicone-containing paint adhesion additive (b) composition.

In addition to the antioxidants, hydrolysable silyl-containing polymer (a) and silicone-containing paint adhesion additive (b) compositions typically contains a moisture-scavenging agent in order to maintain long-term shelf stability. Various alkoxysilanes such as vinyltrimethoxysilane (Silquest A-171 from Momentive Performance Materials), or alkyltrialkoxysilanes such as methyltrimethoxysilane, ethyltrimethoxysilane and the like are effective for this application. They are typically incorporated at a level of 0.1 to 5.0 weight percent based upon the total weight of hydrolysable silyl-containing polymer (a) and silicone-containing paint adhesion additive (b) with 0.5 to 2.5 weight percent based upon the total weight of hydrolysable silyl-containing polymer (a) and silicone-containing paint adhesion additive (b) being more typical.

Typical fillers suitable for formulation of the sealants include reinforcing fillers such as fumed silica, precipitated silica and calcium carbonates. Treated calcium carbonates having particle sizes from 0.07 micrometer to 5.5 micrometers (microns) are preferred and are available under several trade names: Ultra Pflex, Super Pflex, Hi Pflex, Pfinyl 402 from Specialty Minerals; Winnofil SPM, SPT from Solvay; Hubercarb 1Qt, Hubercarb 3Qt and Hubercarb W from Huber; Kotomite from ECC; Omyacarb FT, Omyacarb 3T and Omyacarb UFT from Omya; Camel-Fine ST, Camel-Wite ST and Camel-Cal ST from Imerys. Fillers commonly used in Japan include Hakuenka CCR, Hakuenka CC, Hakuenka TDD, and Viscolite OS from Shiraishi Kogyo; Calfine 200 from Maruo Calcium. These fillers can be used either alone or in combination. The fillers can comprise up to 200 weight percent upon the total weight of hydrolysable silyl-containing polymer (a) and silicone-containing paint adhesion additive (b) with 80 to 150 weight percent upon the total weight of hydrolysable silyl-containing polymer (a) and silicone-containing paint adhesion additive (b) being the more preferred loading level.

Usual plasticizers also can be used to increase elongation and to facilitate use of higher filler levels. Exemplary plasticizers include phthalates, diproplyene and diethylene glycol dibenzoates, diethylene glycol dibenzoate, dipropylene glycol dibenzoate and mixtures thereof, propylene glycol (molecular weight of 200-5000 amu and more favorably 1000-4000 amu) available from Asahi Denka, Asahi Glass or Sankyo Chemical, epoxidized soybean oil and the like. Also, aliphatic diesters such as adipates and sebacates. Useful sources of dioctyl and diisodecylphthalate include those available under the trade names Jayflex DOP and JayFlex DIDP from Exxon Chemical. The dibenzoates are available as Benzoflex 9-88, Benzoflex 9-88 SG, Benzoflex 50 and Benzoflex 400 from Velsicol Chemical Corporation. Other useful plasticizers include hydrocarbon fluids such as Shellsol D60 and Shellsol D80 from Shell Chemical; Conosol C-200 and Conosol C-260 from Penreco; Exxsol D-110 from Exxon Mobil Chemical; Pilot 900 from Petrochem Carless. The plasticizer typically comprises up to 150 weight percent based upon the total weight of hydrolysable silyl-containing polymer (a) and silicone-containing paint adhesion additive (b) with 5 to 50 weight percent based upon the total weight of hydrolysable silyl-containing polymer (a) and silicone-containing paint adhesion additive (b) being preferred.

The interaction of the plasticizer and silicone-containing paint adhesion additives can improve the adhesion of the paint. Examples of plasticizers include Benzoflex 50, Benzoflex 9-88 or Benzoflex 9-88 SG which are used in combination with the silicone paint additives, for example:

$(CH_3)_3SiO-[Si(CH_3)_2O-]_{20}[SiCH_3((CH_2)_3O(CH_2CH_2O)_{10}(CH_2CH(CH_3)O)_{20}H)O-]_3Si(CH_3)_3$; $(CH_3)_3SiO-[Si(CH_3)_2O-]_{50}[SiCH_3((CH_2)_3O(CH_2CH_2O)_{10}(CH_2CH(CH_3)O)_{20}H)O-]_8Si(CH_3)_3$; $(CH_3)_3SiO-[Si(CH_3)_2O-]_{75}[SiCH_3((CH_2)_3O(CH_2CH_2O)_{10}(CH_2CH(CH_3)O)_{20}H)O-]_{10}Si(CH_3)_3$; $(CH_3)_3SiO-[Si(CH_3)_2O-]_{75}[SiCH_3((CH_2)_3O(CH_2CH_2O)_{22}(CH_2CH(CH_3)O)_8H)O-]_{10}Si(CH_3)_3$; $(CH_3)_3SiO-[Si(CH_3)_2O-]_{100}[SiCH_3((CH_2)_3O(CH_2CH_2O)_{10}(CH_2CH(CH_3)O)_{20}H)O-]_{15}Si(CH_3)_3$; $(CH_3)_3SiO-[Si(CH_3)_2O-]_{50}[SiCH_3((CH_2)_3O(CH_2CH_2O)_{10}(CH_2CH(CH_3)O)_{10}CH_3)O-]_5Si(CH_3)_3$; $(CH_3)_3SiO-[Si(CH_3)_2O-]_{70}[SiCH_3((CH_2)_3O(CH_2CH_2O)_{35}(CH_2CH(CH_3)O)_{40}CH_3)O-]_5Si(CH_3)_3$; $(CH_3)_3SiO-[Si(CH_3)_2O-]_{70}[SiCH_3((CH_2)_3O(CH_2CH_2O)_{15}(CH_2CH(CH_3)O)_{15}CH_3)O-]_5Si(CH_3)_3$; $(CH_3)_3SiO-[Si(CH_3)_2O-]_{75}[SiCH_3((CH_2)_3O(CH_2CH_2O)_{15}(CH_2CH(CH_3)O)_{15}CH_3)O-]_5Si(CH_3)_3$; $(CH_3)_3SiO-[Si(CH_3)_2O-]_{100}[SiCH_3((CH_2)_3O(CH_2CH_2O)_{15}(CH_2CH(CH_3)O)_{20}CH_3)O-]_{15}Si(CH_3)_3$; $(CH_3)_3SiO-[Si(CH_3)_2O-]_{75}[SiCH_3((CH_2)_3O(CH_2CH_2O)_{15}(CH_2CH(CH_3)O)_{15}COCH_3)O-]_5Si(CH_3)_3$; and $(CH_3)_3SiO-[Si(CH_3)_2O-]_{75}[SiCH_3((CH_2)_3O(CH_2CH_2O)_{13}(CH_2CH(CH_3)O)_{15}H)O-]_4-[SiCH_3((CH_2)_3O(CH_2CH_2O)_{35}(CH_2CH(CH_3)O)_{40}H)O-]Si(CH_3)_3$.

The amount of plasticizer is between 5 and 50 weight percent and the silicone-containing paint adhesion additive is between 0.1 and 5 weight percent, based upon the total weight of the hydrolysable silyl-containing polymer (a) and the silicone containing paint adhesion additive (b).

The sealant formulation can include various thixotropic or anti-sagging agents. Typical additives are various castor waxes, fumed silica, treated clays and polyamides. The thixotrope include those available as: Aerosil from Degussa, Cabo-Sil TS 720 from Cabot, Castorwax from CasChem, Thixatrol and Thixcin from Rheox; Disparlon 6500 from King Industries; and Crayvallac Super, Crayvallac SLX, and Crayvallac SL from Cray Valley. These additives typically compromise 0.1 to 10 weight percent based upon the total weight of hydrolysable silyl-containing polymer (a) and silicone-containing adhesion additive (b), with 0.5 to 6 weight percent based upon the total weight of hydrolysable silyl-containing polymer (a) and silicone-containing paint adhesion additive (b) being preferred.

Ultra-violet stabilizers or antioxidants can also be incorporated into the sealant formulation in an amount from 0.1 to 5 weight percent based weight percent based upon the total weight of hydrolysable silyl-containing polymer (a) and silicone-containing adhesion additive (b) with 0.5 to 3 weight percent based weight percent based upon the total weight of hydrolysable silyl-containing polymer (a) and silicone-containing adhesion additive (b) being preferred. These materials are available from Ciba-Geigy under the trade names Tinuvin® 770, Tinuvin 327, Tinuvin 326, Tinuvin 213, Tinuvin 622 and Irganox® 1010.

Various organofunctional silane and siloxane adhesion promoters to inorganic substrates are useful in the sealant formulation. These materials are typically employed at levels of 0.1 to 5 weight percent based upon the total weight of hydrolysable silyl-containing polymer (a) and silicone-containing paint adhesion additive (b), with 0.5 to 2.5 weight percent based upon the total weight of hydrolysable silyl-containing polymer (a) and silicone-containing paint adhesion additive (b) being preferred. Suitable adhesion promoters would include but are not limited to various aminosilane such as Silquest® A-1120 silane, Silquest A-1110 silane, Silquest A-2120 silane, and Silquest A-1170 silane; epoxysilanes, such as Silquest A-187 silane; isocyanurate silanes such as Silquest A-597 silane; and mercaptosilanes such as Silquest A-189 silane, Silquest A-1891 silane, Silquest A-599 silane available from Momentive Performance Materials.

The hydrolysable silyl-containing polymer (a) and silicone-containing paint adhesion additive (b) compositions typically incorporate a cure catalyst in order to achieve timely curing (crosslinking) of curable silyl-containing polymer (a) and silicone-containing paint adhesion additive (b) compositions. Various metal complexes of tin, titanium, zirconium and the like are suitable for curing these compositions. Dialkytin dicarboxylates, such as dibutyltin dilaurate and dibutyltin acetate, the stannous salts of carboxylic acids, such as stannous octoate and stannous acetate, and the like are most suitable. The preferred catalyst is dibutyltin dilaurate. The tin catalyst may be used alone or in combination with a tertiary amine such as lauryl amine. The catalyst typically compromise 0.01 to 3 weight percent based upon the total weight of hydrolysable silyl-containing polymer (a) and silicone-containing paint adhesion additive (b) with 0.05 to 1.0 weight percent based upon the total weight of hydrolysable silyl-containing polymer (a) and silicone-containing paint adhesion additive (b) being preferred.

The formulation may also contain an additional quantity of a dehydrating agent in order to maintain package stability. Various vinylalkoxysilanes, such as the non-limiting example of vinyltrimethoxysilane (Silquest A-171 from Momentive Performance Materials), or alkyltrialkoxy silanes, such as the non-limiting examples of methyltrimethoxysilane and ethyltrimethoxysilane and the like, are effecting for this application. They are typically incorporated at a level of 0.1 to 5.0 weight percent based upon the total weight of hydrolysable silyl-containing polymer (a) and silicone-containing paint adhesion additive (b) with 1.0 to 3.0 weight percent based upon the total weight of hydrolysable silyl-containing polymer (a) and silicone-containing paint adhesion additive (b) being more typical.

The formulation may also include other additives typically employed for sealant applications these would include pigments or other colorants, dyes, fungicides, and biocides.

Hydrolysable silyl-containing polymer (a) useful in the present invention include, but are not limited to SPUR$^+$ 1015LM, SPUR$^+$1050MM and the like available from Momentive Performance Materials, Inc.

The hydrolysable silyl-containing polymer (a), a silicone-containing paint adhesion additive (b) and other additional components are mixed according to processes known in the art and include mixing with a planetary mixer, a homogenizer, mechanical stirrer, extruder, Hauschild mixer and the like. Generally, the silicone-containing paint adhesion additive (b), fillers, desiccant, and other additional components are added to the hydrolysable silyl-containing polymer (a). A desiccant is used to remove any excess water that may be present on the filler, pigments and other components and adds to the stability of the curable compositions comprising hydrolysable silyl-containing polymer (a), a silicone-containing paint adhesion additive (b) and optional ingredients.

Continuous Mode preparation, as described in U.S. Pat. No. 5,519,104 assigned to General Electric Company, and incorporated herein by reference. The curable compositions comprising hydrolysable silyl-containing polymer (a) and a silicone-containing paint adhesion additive (b) of the present invention, such as the non-limiting example of sealants, may be prepared continuously using an extruder used to mix the components of the present invention.

In a non-limiting example, a curable composition incorporating the components presented in Table 1 are prepared in a 30 mm Werner-Pfliederer twin-screw extruder employing the following mixing procedure: Werner-Pfliederer Extruder Mixing Procedure: All sections of the extruder were heated to 75° C. To barrel 1 on the extruder, there was continuously metered the hydrolysable silyl-containing polymer (a), a silicone-containing paint adhesion additive (b) and the calcium carbonate filler. To barrel 3 of the extruder there was continuously metered in a blend of the plasticizer, organofunctional silane adhesion promoter and antioxidants (Irganox) and light stabilizer (Tinuvins). To barrel 3 of the extruder there was continuously metered in a pre-blend of the plasticizer and the tin catalyst. The sealant, a curable composition of the present invention, was produced in the extruder at a rate of 40 lb/hr. Different size extruders can be used to prepare the compositions of the present invention.

For further details regarding the preparation of curable compositions comprising hydrolysable silyl-containing polymer (a), a silicone-containing adhesion additive (b) and optionally, other components, reference may be made to U.S. patent application Ser. No. 11/71,500, Huang, et al., filed Mar. 7, 2007, entitled "Moisture-Curable Silylated Polymer Resin Composition," the entire contents of which are incorporated by reference herein.

Curable compositions, such as one or two part sealants, incorporating hydrolysable silyl-containing polymer (a), and a silicone-containing paint adhesion additive (b) of the present invention along with optional ingredients including fillers, plasticizer, thixotropes, antioxidant, ultra-violet stabilizers, adhesion promoter(s), biocides, cure catalyst and the like can be prepared using either a batch or continuous process.

A representative, non-limiting example of a one-part curable composition comprising a hydrolysable silyl-containing polymer (a) and a silicone-containing paint adhesion additive (b) is presented in Table 1.

TABLE 1

| Components | Amount, phr[1] |
|---|---|
| Hydrolysable silyl-containing polymer (a) | 100.0 |
| Silicone-containing adhesion additive (b) | 2.1 |
| Flow ability controlling agent | 42 |
| Plasticizer | 50 |
| Dehydrating agent | 3.8 |
| Calcium Carbonate small particle size | 104 |
| Calcium Carbonate large particle size | 100 |
| Light Stabilizer | 2.5 |
| Titanium Dioxide | 8.3 |
| Thixotrope | 4.2 |
| Adhesion Promoter | 2.1 |
| Tin Catalyst | 0.17 |

[1]phr represents part per hundred rubber, wherein the rubber component is the hydrolysable silyl-containing polymer (a).

The curable compositions comprising a hydrolysable silyl-containing polymer (a), a silicone-containing paint adhesion additive (b) and optional other ingredients are cured by exposure to water. The most common method is to form the curable composition into the desired shape and then allow atmospheric moisture or artificially control moisture content in air. The exposure may occur between 0 and 120° C., but it is preferable to expose the shaped curable composition at 10 to 50° C. and more preferably between 15 and 35° C.

In one embodiment, the cured composition of the present invention will have after curing at 50 percent relative humidity for 7 days, a contact angle measured using a 3 microliter droplet of water and allowing it to equilibrate for 10 seconds, of least than 90°, and in another embodiment between 1 and 80°, and yet another embodiment between 10 and 70°.

According to one embodiment, after curing, the curable compositions of the present invention can be coated with a paint, coating or other surface treatment wherein the paint, coating or other surface treatment will have at least a 3 B, preferably a 4 B and most preferably a 5 B adhesion, as measured by ASTM D3359. Specifically, the cured composition of the present invention in which the paint adhesion as measured by ASTM D3359 has a value ranging from about 4 B to about 5 B within 4 days of being painted with Manor Halle Interior Pearl Latex for walls & trims by Pittsburgh Paints of purple color; short as "Satin".

A better understanding of the present invention and of its many advantages can be obtained by referring to the following specific examples, given by way of illustration.

Batch approach for preparing the curable composition of the present invention employs a Hauschild DAC 600 FVZ Speedmixer. Alternatively, a standard double planetary or similar mixer may be used. A 300-gram batch was prepared for the Examples and Comparative Examples.

Continuous Mode preparation, as described in U.S. Pat. No. 5,519,104 assigned to General Electric Company, and incorporated herein by reference. The curable compositions comprising hydrolysable silyl-containing polymer (a) and a silicone-containing paint adhesion additive (b) of the present invention, such as sealants, may be prepared continuously using a 30 mm Werner-Pfliederer twin-screw extruder, a curable composition incorporating the components outlined in Table 1 above employing the following mixing procedure.

The continuous approach for preparing the curable composition of the present invention employs a Werner-Pfliederer Extruder. The mixing procedure was as follows: All sections of the extruder were heated to 75° C. To barrel 1 on the extruder, there was continuously metered the hydrolysable silyl-containing polymer (a), a silicone-containing paint adhesion additive (b) and the calcium carbonate filler. To barrel 3 of the extruder there was continuously metered in a blend of the plasticizer, organofunctional silane adhesion promoter and antioxidants (Irganox) and light stabilizer (Tinuvins). To barrel 3 of the extruder there was continuously metered in a pre-blend of the plasticizer and the tin catalyst. The sealant, a curable composition of the present invention, was produced in the extruder at a rate of 40 lb/hr. Different size extruders can be used to prepare the compositions of the present invention.

Representative structures of the silicone-containing paint adhesion additives of the invention are illustrated by A and B as follows:

Silicone-containing paint adhesion additive A:

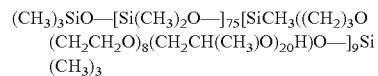

$(CH_3)_3SiO-[Si(CH_3)_2O-]_{75}[SiCH_3((CH_2)_3O(CH_2CH_2O)_8(CH_2CH(CH_3)O)_{20}H)O-]_9Si(CH_3)_3$

Silicone-containing paint adhesion additive B:

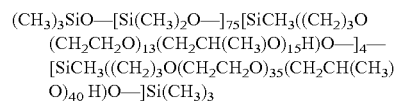

$(CH_3)_3SiO-[Si(CH_3)_2O-]_{75}[SiCH_3((CH_2)_3O(CH_2CH_2O)_{13}(CH_2CH(CH_3)O)_{15}H)O-]_4-[SiCH_3((CH_2)_3O(CH_2CH_2O)_{35}(CH_2CH(CH_3)O)_{40}H)O-]Si(CH_3)_3$

Structures of comparative silicone copolymers outside the scope of silicone-containing paint adhesion additives are illustrated by silicone additives C-F as follows:

Silicone Additive C:

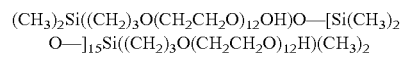

$(CH_3)_2Si((CH_2)_3O(CH_2CH_2O)_{12}OH)O-[Si(CH_3)_2O-]_{15}Si((CH_2)_3O(CH_2CH_2O)_{12}H)(CH_3)_2$

Silicone Additive D:

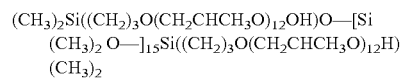

$(CH_3)_2Si((CH_2)_3O(CH_2CHCH_3O)_{12}OH)O-[Si(CH_3)_2O-]_{15}Si((CH_2)_3O(CH_2CHCH_3O)_{12}H)(CH_3)_2$

Silicone Additive E:

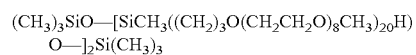

$(CH_3)_3SiO-[SiCH_3((CH_2)_3O(CH_2CH_2O)_8CH_3)_{20}H)O-]_2Si(CH_3)_3$

Silicone Additive F:

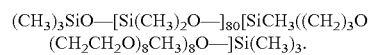

$(CH_3)_3SiO-[Si(CH_3)_2O-]_{80}[SiCH_3((CH_2)_3O(CH_2CH_2O)_8CH_3)_8O-]Si(CH_3)_3.$

Sealant Preparation: Representative sealant formulations of Comparative Examples 1-3 without the silicone-containing paint adhesion additive and Examples 4-6 with the silicone-containing paint adhesion additive (i.e., silicone-containing paint adhesion additive A, described above) of the present invention are listed in Table 2.

TABLE 2

| Components | Comparative Example 1 | Comparative Example 2 | Comparative Example 3 | Example 4 | Example 5 | Example 6 |
|---|---|---|---|---|---|---|
| Polymer (a), SPUR* 1015LM | 24.00 | 24.00 | 24.00 | 24.00 | 24.00 | 24.00 |
| DIDP | 11.96 | — | — | 11.96 | — | — |
| Benzoflex 50 | — | 11.96 | — | — | 11.96 | — |
| DIDP(50%) + Benzoflex 50(50%) | — | — | 11.96 | — | — | 11.96 |
| Conosol | 10.00 | 10.00 | 10.00 | 9.50 | 9.50 | 9.50 |
| TiO2 | 2.00 | 2.00 | 2.00 | 2.00 | 2.00 | 2.00 |
| Crayvallac SLX | 1.00 | 1.00 | 1.00 | 1.00 | 1.00 | 1.00 |
| Tinuvin 327 | 0.30 | 0.30 | 0.30 | 0.30 | 0.30 | 0.30 |
| Tinuvin 770 | 0.30 | 0.30 | 0.30 | 0.30 | 0.30 | 0.30 |
| Hi-Pflex 100 | 24.00 | 24.00 | 24.00 | 24.00 | 24.00 | 24.00 |
| Ultra-Pflex | 25.00 | 25.00 | 25.00 | 25.00 | 25.00 | 25.00 |
| VTMS (A-171) | 0.90 | 0.90 | 0.90 | 0.90 | 0.90 | 0.90 |
| Silicone Additive A | — | — | — | 0.50 | 0.50 | 0.50 |
| DBTDL | 0.04 | 0.04 | 0.04 | 0.04 | 0.04 | 0.04 |
| Silquest A-1120 silane | 0.50 | 0.50 | 0.50 | 0.50 | 0.50 | 0.50 |
| Total (wt %) | 100.0 | 100.0 | 100.0 | 100.0 | 100.0 | 100.0 |

The hydrolysable silyl-containing polymer (a), SPUR* 1015LM available from Momentive Performance Materials, Inc., was incorporated into the one-part sealant in a conventional manner using a Hauschild mixer according to the following steps: polymer (a), DIDP, Consol, TiO2, Crayvallac, Tinuvin 327, Tinuvin 770, HiPflex 100, UltraPflex, and vinyltrimethoxysilane were weighted into a MAX 300 cup. The cup was closed and mixed on the mixer at high speed for 20 minutes in a Hauschild DAC 600 FVZ Speedmixer. The cup was removed and allowed to cool. After cooling the silicone-containing paint adhesion additive, Silquest A-1120 silane, and dibutyltin dilaurate (DBTDL) were added and the cup was mixed for an additional minute at high speed.

Sealants were fully cured under controlled conditions, for 1 week at 23° C. and 50% relative humidity (RH), prior to testing. The physical properties were evaluated by using standard ASTM test procedures. These included tensile strength, elongation, modulus (ASTM D 412); Shore A hardness (ASTM C 661).

Figure 2:
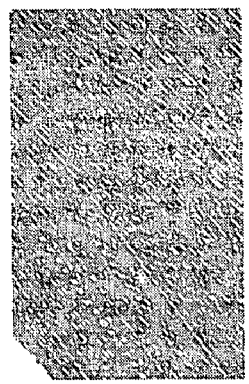
FIG. 2 depicts the scale of "fair" paintability, i.e., paint sample forms numerous narrow streaks when applied to cured sealant.
Figure 3:
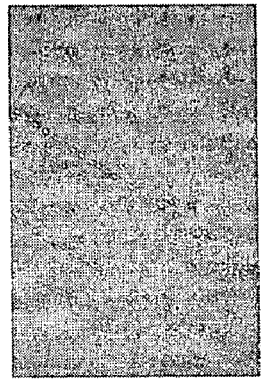
FIG. 3 depicts the scale of "good" paintability, i.e., paint sample forms few and narrow streaks when applied to cured sealant.

Paintability is described on a scale of poor, fair and good. The paintability is judged by coating the surface of the cured sealant, i.e., the formula presented in Table 2 for 1 week at 23° C. The scale of "poor" paintability is when the paint forms numerous non-continuous wide streaks thereby exposing bare or unpainted cured composition (sealant) surface of the present invention (see FIG. 1). The scale of "fair" paintability is when the grey paint shows significant amounts of streaks on the white base of the cured sealant (see FIG. 2). The scale of "good" paintability is when the paint show fewer and narrower streaks of white base of the cured sealant (see FIG. 3).

Paint adhesion was tested using ASTM D3359-95a, test method B-cross cut tape test. When paint coating on the cured sealant is dried, use cross cut blade tool to mark the liner, and use the tape to test the adhesion. Ratings are displayed in Table 2A, according to ASTM D3359-95a.

TABLE 2A

| Classification | 5B | 4B | 3B | 2B | 1B | 0B |
|---|---|---|---|---|---|---|
| % area removed | 0% none | Less than 5% | 5-15% | 15-35% | 35-65% | Greater than 65% |

Contact angle is measured on the cured and unpainted sealant by the advanced Goniometer, made by Rame-hart Inc. The droplet size is 3 microliter and time to the measurement is set to be 10 sec.

Paints used to illustrate the advantages of the silicone-containing paint adhesion additive are:
ColorPlace® Exterior Acrylic Latex Flat Home Paint custom color by Walmart of green color; short as "FLAT"
Manor Hall® Interior Pearl Latex for walls & trims by Pittsburgh Paints of purple color; short as "Satin"
E-Z KARE® Interior Acrylic Latex semi-gloss enamel by True Value Manufacturing of brown color, short as "Enamel"

COMPARATIVE EXAMPLES 1-3, EXAMPLES 4-6

Table 3 displays, inter alia, the adhesion capability of Comparative Examples 1 to 3 and Example 4 to 6 (the formula of each is presented in Table 2) as represented by the number of days for sealant paint adhesion to reach a 5 B rating.

TABLE 3

|  | Comparative Example 1 | Comparative Example 2 | Comparative Example 3 | Example 4 | Example 5 | Example 6 |
|---|---|---|---|---|---|---|
| Mechanical properties |  |  |  |  |  |  |
| Shore A | 31 | 38 | 30 | 29 | 33 | 30 |
| Tensile (psi) | 155 | 262 | 188 | 185 | 184 | 197 |
| Elongation (%) | 231 | 414 | 317 | 326 | 337 | 319 |
| 50% Modulus (psi) | 54 | 85 | 62 | 54 | 59 | 63 |
| 100% Modulus (psi) | 88 | 124 | 100 | 86 | 92 | 101 |
| Paintability/coatability |  |  |  |  |  |  |
| Flat Latex Paint | good | good | good | good | good | good |
| Satin Latex Paint | good | good | good | good | good | good |
| Semi Gloss Latex Enamel | poor | poor | fair | good | good | good |
| Paint adhesion | Number of days to achieve ASTM D3359 Class 5B adhesion results | | | | | |
| Flat Latex Paint | >4 | 3 | 4 | 2 | 1 | 2 |
| Satin Latex Paint | >4 | 2 | 2 | 2 | 1 | 2 |
| Semi Gloss Latex Enamel | >4 | >4 | >4 | >4 | 1 | >4 |
| Contact Angles |  |  |  |  |  |  |
| Water droplet | 91 | 95 | — | 87 | 62 | — |
| Semi Gloss Latex Enamel droplet | 82 | 69 | — | 59 | 58 | — |

COMPARATIVE EXAMPLES 7, EXAMPLES 8-10

Table 4 presents data representing the influence of DIDP plasticizer and various concentrations of silicone-containing paint adhesion additive A on paintablility and paint adhesion of Comparative Examples 7 (contains the same formulation as Comparative Example 1) and Examples 8-10 (contains the same formulation as Example 4 with the concentration of the silicone-containing paint adhesion additive indicated in Table 4).

TABLE 4

| Plasticizer DIDP | Comparative Example 7 | Example 8 | Example 9 | Example 10 |
|---|---|---|---|---|
| Concentration of Silicone-Containing Paint Adhesion Additive A | 0 | 0.1 | 0.5 | 1.0 |
| Flat Latex Paint | good | good | good | good |
| Satin Latex Paint | good | good | good | good |
| Semi Gloss Latex Enamel | poor | fair | good | good |
| Paint adhesion |  |  |  |  |
| Flat Latex Paint | >4 | >4 | 2 | 1 |
| Satin Latex Paint | >4 | >4 | 2 | 3 |
| Semi Gloss Latex Enamel | >4 | >4 | >4 | — |
| Contact Angles |  |  |  |  |
| Water droplet | 93 | 88 | 75 | 58 |

COMPARATIVE EXAMPLE 11, EXAMPLE 12-14

Table 5 presents data representing the influence of Benzoflex 50 plasticizer and various concentrations of silicone-containing paint adhesion additive A on the paintablility and paint adhesion of Comparative Examples 11 (contains the same formulation as Comparative Example 2) and Examples 12-14 (contains the same formulation as Example 5 with the concentration of the silicone-containing paint adhesion additive indicated in Table 5).

TABLE 5

| Plasticizer Benzoflex 50 | Comparative Example 11 | Example 12 | Example 13 | Example 14 |
|---|---|---|---|---|
| Concentration of Silicone Containing Paint Adhesion Additive A | 0 | 0.1 | 0.5 | 1.0 |
| Flat Latex Paint | good | good | good | good |
| Satin Latex Paint | good | good | good | good |
| Semi Gloss Latex Enamel | poor | fair | good | good |
| Paint adhesion |  |  |  |  |
| Flat Latex Paint | 3 | 2 | 1 | 1 |
| Satin Latex Paint | 2 | 1 | 1 | 1 |
| Semi Gloss Latex Enamel | >4 | >4 | 1 | — |
| Contact Angles |  |  |  |  |
| Water droplet | 96 | 70 | 65 | 63 |

COMPARATIVE 15, EXAMPLES 16-18

Table 6 presents data representing the influence of Benzoflex 9-88 plasticizer and various concentrations of silicone-containing paint adhesion additive A on the paintablility and paint adhesion of Comparative Examples 15 (contains the same formulation as Comparative Example 1 except Benzoflex 9-88 is added as the plasticizer in the amount of 11.96 weight percent) and Examples 16-18 (contains the same formulation as Comparative Example 1 except Benzoflex 9-88 is added as the plasticizer in the amount of 11.96 weight percent and silicone-containing paint adhesion additive A per concentrations listed in Table 6).

TABLE 6

| Plasticizer Benzoflex 9-88 | Comparative Example 15 | Example 16 | Example 17 | Example 18 |
|---|---|---|---|---|
| Concentration of Silicone Containing Paint Adhesion Additive A | 0 | 0.1 | 0.5 | 1.0 |
| Flat Latex Paint | good | good | good | good |
| Satin Latex Paint | good | good | good | good |
| Semi Gloss Latex Enamel | poor | fair | good | good |

TABLE 6-continued

| Plasticizer Benzoflex 9-88 | Comparative Example 15 | Example 16 | Example 17 | Example 18 |
|---|---|---|---|---|
| Paint adhesion | | | | |
| Flat Latex Paint | 4 | 4 | 1 | 1 |
| Satin Latex Paint | 3 | 2 | 1 | 1 |
| Semi Gloss Latex Enamel | >4 | >4 | 1 | — |
| Contact Angles | | | | |
| Water droplet | 99 | 83 | 83 | 80 |

COMPARATIVE EXAMPLES 19-26, EXAMPLES 27-30

Table 7 presents adhesion data for Comparative Examples 19-26 and Examples 27-30. The formulation of Comparative Examples 19-26 and Examples 27-30 is the same as Comparative Example 1 except for the addition of silicone additives C-F and silicone-containing paint adhesion additive A and B, respectively. The qualitative assessment of adhesion of Flat Latex Paint was made in less than 1 day.

TABLE 7

| Example No. | Silicone Additive | Concentration, weight percent | Adhesion of Flat Latex Paint |
|---|---|---|---|
| Comparative Example 19 | E | 0.1 | N |
| Comparative Example 20 | E | 0.8 | N |
| Comparative Example 21 | F | 0.1 | N |
| Comparative Example 22 | F | 0.8 | N |
| Comparative Example 23 | D | 0.1 | N |
| Comparative Example 24 | D | 0.8 | N |
| Comparative Example 25 | C | 0.1 | N |
| Comparative Example 26 | C | 0.8 | N |
| Example 27 | A | 0.1 | Y |
| Example 28 | A | 0.8 | Y |
| Example 29 | B | 0.1 | N |
| Example 30 | B | 0.8 | Y |

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

The invention claimed is:

1. A curable silyl-containing polymer composition comprising:

a) at least one hydrolysable silyl-containing polymer represented by the general formula:

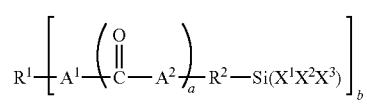

wherein:

$R^1$ is a monovalent or polyvalent organic polymer fragment having a number average molecular weight of from about 500 to about 100,000 grams/mole;

each occurrence of $R^2$ is independently a divalent hydrocarbyl group containing from 1 to 12 carbon atoms selected from the group consisting of divalent alkylene, alkenylene, arenylene, arylene and aralkylene, and, optionally, contains at least one heteroatom selected from the group consisting of oxygen, nitrogen and sulfur;

each occurrence of $A^1$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl or —$R^2SiX^1X^2X^3$ group, wherein each $R^3$, other than hydrogen, contains from 1 to 18 carbon atoms, and with the provisos that when $A^1$ is oxygen or sulfur, then $A^2$ is $(-)_2NR^3$ and when a is 0, then $A^1$ is oxygen;

each occurrence of $A^2$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl or —$R^2SiX^7X^8X^9$ group, wherein each $R^3$, other than hydrogen, contains from 1 to 18 carbon atoms, and with the provisos that when $A^2$ is oxygen or sulfur, then $A^1$ is $(-)_2NR^3$;

each occurrence of $X^1$ is independently selected from the group consisting of $R^4O$—, $R^4C(=O)O$—, $R^4_2C=NO$—, $R^4_2C=CR^4O$—, and $R^4_2NO$— wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms, and, optionally, contains at least one oxygen or sulfur atom;

each occurrence of $X^2$ and $X^3$ is independently selected from the group consisting of $R^4O$—, $R^4C(=O)O$—, $R^4_2C=NO$—, $R^4_2C=CR^4O$—, $R^4_2NO$—and $R^4$ wherein each $R^4$ is independently selected from the group consisting of hydrogen, alkyl, alkenyl, arenyl, aryl, and aralkyl groups, wherein each $R^4$, other than hydrogen, contains from 1 to 18 carbon atoms and, optionally, contains at least one oxygen or sulfur atom; and, each occurrence of subscripts a and b is independently an integer wherein a is 0 or 1 and b is 1 to 6.

b) at least one silicone-containing paint adhesion additive selected from the group consisting of:

$(CH_3)_3SiO$—$[Si(CH_3)_2O$—$]_{20}[SiCH_3((CH_2)_3O(CH_2CH_2O)_{10}(CH_2CH(CH_3)O)_{20}H)O$—$]_3Si(CH_3)_3$;

$(CH_3)_3SiO$—$[Si(CH_3)_2O$—$]_{50}[SiCH_3((CH_2)_3O(CH_2CH_2O)_{10}(CH_2CH(CH_3)O)_{20}H)O$—$]_8Si(CH_3)_3$;

$(CH_3)_3SiO$—$[Si(CH_3)_2O$—$]_{75}[SiCH_3((CH_2)_3O(CH_2CH_2O)_{10}(CH_2CH(CH_3)O)_{20}H)O$—$]_{10}Si(CH_3)_3$;

$(CH_3)_3SiO$—$[Si(CH_3)_2O$—$]_{75}[SiCH_3((CH_2)_3O(CH_2CH_2O)_{22}(CH_2CH(CH_3)O)_8H)O$—$]_{10}Si(CH_3)_3$;

$(CH_3)_3SiO$—$[Si(CH_3)_2O$—$]_{100}[SiCH_3((CH_2)_3O(CH_2CH_2O)_{10}(CH_2CH(CH_3)O)_{20}H)O$—$]_{15}Si(CH_3)_3$;

$(CH_3)_3SiO$—$[Si(CH_3)_2O$—$]_{50}[SiCH_3((CH_2)_3O(CH_2CH_2O)_{10}(CH_2CH(CH_3)O)_{10}CH_3)O$—$]_5Si(CH_3)_3$;

$(CH_3)_3SiO$—$[Si(CH_3)_2O$—$]_{70}[SiCH_3((CH_2)_3O(CH_2CH_2O)_{35}(CH_2CH(CH_3)O)_{40}CH_3)O$—$]_5Si(CH_3)_3$;

$(CH_3)_3SiO$—$[Si(CH_3)_2O$—$]_{70}[SiCH_3((CH_2)_3O(CH_2CH_2O)_{15}(CH_2CH(CH_3)O)_{15}CH_3)O$—$]_5Si(CH_3)_3$;

$(CH_3)_3SiO$—$[Si(CH_3)_2O$—$]_{75}[SiCH_3((CH_2)_3O(CH_2CH_2O)_{15}(CH_2CH(CH_3)O)_{15}CH_3)O$—$]_5Si(CH_3)_3$;

$(CH_3)_3SiO—[Si(CH_3)_2O—]_{100}[SiCH_3((CH_2)_3O(CH_2CH_2O)_{15}(CH_2CH(CH_3)O)_{20}CH_3)O—]_{15}Si(CH_3)_3$;

$(CH_3)_3SiO—[Si(CH_3)_2O—]_{75}[SiCH_3((CH_2)_3O(CH_2CH_2O)_{15}(CH_2CH(CH_3)O)_{15}COCH_3)O—]_5Si(CH_3)_3$;

and $(CH_3)_3SiO—[Si(CH_3)_2O—]_{75}[SiCH_3((CH_2)_3O(CH_2CH_2O)_{13}(CH_2CH(CH_3)O)_{15}H)O—]_4—[SiCH_3((CH_2)_3O(CH_2CH_2O)_{35}(CH_2CH(CH_3)O)_{40}H)O—]Si(CH_3)_3$.

c) optionally, at least one ingredient selected from the group consisting of filler, plasticizer, thixotrope, antioxidant, ultra-violet stabilizer, adhesion promoter, cure catalyst, moisture scavenger, pigment, dye, surfactant, solvent and biocide.

2. The composition of claim 1 wherein the hydrolysable silyl-containing polymer is a hydrolysable silylated hydrogenated polybutadiene diol.

3. The composition of claim 1 wherein the hydrolysable silyl-containing polymer is a hydrolysable silylated polyether diol.

4. The composition of claim 1 wherein the hydrolysable slyl-containing polymer is hydrolysable silylated polyurethane.

5. The composition of claim 1 wherein the hydrolysable silyl-containing polymer is a hydrolysable silylated polyurethane obtained from a polyether diol, a diisocyanate and an active hydrogen-containing hydrolysable silane.

6. The composition of claim 1 wherein the hydrolysable silyl-containing polymer is a silylated polyurethane obtained from the reaction of hydroxyl-terminated polyether polyol and isocyanatosilane.

7. The composition of claim 1 wherein the hydrolysable silyl-containing polymer is a silylated polyurethane obtained from the reaction of an isocyanato-terminated polyether polyol and aminosilane.

8. The composition of claim 1 wherein hydrolysable silyl-containing polymer ranges in amount from 90 to 99.95 weight percent based upon the total weight of hydrolysable silyl-containing polymer (a) and silicone-containing paint adhesion additive (b).

9. The composition of claim 1 wherein hydrolysable silyl-containing polymer ranges in amount from 95 to 99.9 weight percent based upon the total weight of hydrolysable silyl-containing polymer (a) and silicone-containing paint adhesion additive (b).

10. The composition of claim 1 wherein silyl-containing polymer ranges in amount from 97 to 99.5 weight percent based upon the total weight of hydrolysable silyl-containing polymer (a) and silicone-containing paint adhesion additive (b).

11. The composition of claim 1 wherein silicone-containing paint adhesion additive ranges in amount from 0.05 to 10 weight percent based upon the total weight of hydrolysable silyl-containing polymer (a) and silicone-containing paint adhesion additive (b).

12. The composition of claim 1 wherein silicone-containing paint adhesion additive ranges in amount from 0.1 to 5 weight percent upon the total weight of hydrolysable silyl-containing polymer (a) and silicone-containing paint adhesion additive (b).

13. The composition of claim 1 wherein the silicone-containing paint adhesion additive ranges in amount from 0.5 to 3 weight percent based upon the total weight of hydrolysable silyl-containing polymer (a) and silicone-containing paint adhesion additive (b).

14. The composition of claim 1 wherein the silicone-containing paint adhesion additive (b) has a viscosity that ranging from 100 to 5000 cSt.

15. The cured composition of claim 1.

16. The composition of claim 15 wherein the cured composition has a contact angle measured using a 3 microliter droplet of water and allowing it to equilibrate for 10 seconds of least than 90°.

17. A sealant prepared with the composition of claim 1.

18. The sealant of claim 17 having a paint adhesion value ranging from 4B to 5B within 4 days of being painted as measured by ASTM D3359.

* * * * *